UNITED STATES PATENT OFFICE.

WILLIAM JAMES CORDNER, OF LONDON, ENGLAND, ASSIGNOR TO LOUIS D. BRANDEIS, TRUSTEE, OF BOSTON, MASSACHUSETTS.

COMPOSITE MATERIAL APPLICABLE FOR ELECTRIC INSULATION.

SPECIFICATION forming part of Letters Patent No. 654,952, dated July 31, 1900.

Original application filed October 17, 1899, Serial No. 733,908. Divided and this application filed February 6, 1900. Serial No. 4,195. (No specimens.)

*To all whom it may concern:*

Be it known that I, WILLIAM JAMES CORDNER, a subject of the Queen of Great Britain and Ireland, residing at 17 Shaftesbury avenue, London, England, have invented a new and useful Improvement in Composite Material Applicable for Electric Insulation and other Purposes, (for which I have made application for Letters Patent in Great Britain under No. 13,846, dated July 4, 1899; in Canada under No. 87,773, dated October 26, 1899; in Germany under date November 9, 1899; in Austria under date November 20, 1899; in France under No. 282,232, dated November 9, 1899; in Belgium under No. 115,061, dated November 15, 1899, and in Sweden under date November 20, 1899,) of which the following is a specification.

This invention relates to the manufacture of a composition from rhea fiber applicable for electric insulation and other purposes, such as the manufacture of articles which are usually now made of india-rubber and the like, and has for its object the production of a material which shall be a high electrical insulator in comparison to its thickness, which is practically a non-absorbent of water, and which can be produced at a low cost.

To carry my invention into effect, the rhea fiber is first cleaned from impurities by washing and drying in any of the well-known ways, such as by treatment with carbonate of soda, and if the final composition is for use in high-class insulation it may be necessary to degum the material before commencing the process hereinafter described by treatment under the Gomes patented process of degumming or by other equivalent means. After the above-described preliminary treatment the rhea fiber is immersed in a solution of silicate of soda of a density of from 15° to 20° Baumé, the exact density being dependent on the amount of gum in the fiber. For example, the greatest density of 20° Baumé is only used when the fiber has been thoroughly degummed. When the fiber is thoroughly saturated, it is carefully dried in a suitable oven or drying-room at temperatures commencing at 80° and rising to 250° Fahrenheit until all the moisture has been extracted. The fiber is next immersed in a bath of resin or other heavy hydrocarbon oil at a temperature of about 275° Fahrenheit until it has taken up all the oil it can possibly absorb, when it is removed from the oil-bath and placed into a machine such as a hydro extractor or press, which is worked in a temperature of 300° Fahrenheit, and the superfluous oil is extracted. The fiber is then suspended in a drying-room and thoroughly dried in a temperature of 250° Fahrenheit until by the reaction of the silicate of soda and heavy hydrocarbon on the fiber it has assumed the character of pure hydrocarbon cellulose. It is then carefully examined, and the parts that have not assumed the desired character—*i. e.*, a complete transformation into cellulose—are removed and re-treated to the hydrocarbon bath and extraction processes and again put into the drying-room. Having formed the cellulose in the manner described, it is thoroughly treated mechanically in a dry mixer until the original fibrous formation of the material has entirely disappeared. It is now ready for incorporation with oils, resins, gums, and similar materials, such as linseed-oil, resin-oil, and rubber-oil, and balata-gum, pontianak-gum, india-rubber, and gutta-percha, according to the class of material desired. For example, if hard material is required an excess of resinous gums is mixed with the cellulose, or if soft and flexible material is required a larger amount of readily-oxidizable oil is incorporated, the oil being first treated and thickened with oxygen gas, which is advantageously given off by black oxid of manganese when heated. This method imparts no disagreeable smell to the resultant product.

I have found the following mixtures to give good results for the classes of material specified:

Very high quality, hard: cellulose, eight pounds; negro-head rubber, eight pounds; whiting, sixteen pounds; sulfur, eight pounds; lime, one and one-half pounds; lamp-black, one and one-half pound. Vulcanize six hours at forty-five pounds pressure.

Very high quality, soft: cellulose, eight pounds; negro-head rubber, eight pounds; whiting, four pounds; sulfur, one-half pound. Vulcanize forty minutes at forty pounds pressure.

For cable insulation, where a very high resistance is required, it is sometimes advisable to add a small portion of gutta-percha; but this is not necessary for purposes of ordinary insulation. In a similar sense the heavy hydrocarbon cellulose may be employed to load india-rubber.

Having now described my invention, what I claim, and desire to secure by Letters Patent, is—

A composite material made from a heavy hydrocarbon cellulose derived from rhea fiber, mixed with oils, resins, gums and similar materials, substantially as described.

In witness whereof I have hereunto set my hand in presence of two witnesses.

WILLIAM JAMES CORDNER.

Witnesses:
LINDSAY RALFS CASEY,
CHARLES THOMAS YOUNG.